Figure 1:
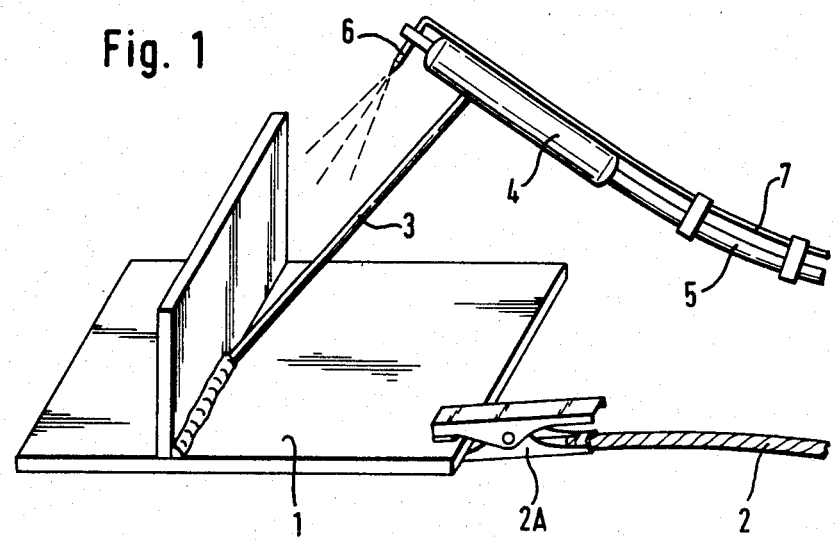

United States Patent [19]
Heed

[11] Patent Number: 4,538,048
[45] Date of Patent: Aug. 27, 1985

[54] WELDING METHOD AND EQUIPMENT THEREFOR

[76] Inventor: Björn Heed, Utlandagatan 19, 412 61 Götenborg, Sweden

[21] Appl. No.: 416,548

[22] Filed: Sep. 10, 1982

[30] Foreign Application Priority Data

Sep. 15, 1981 [SE] Sweden ............................. 8105476
Jun. 29, 1982 [SE] Sweden ............................. 8203992

[51] Int. Cl.³ .............................................. B23K 9/32
[52] U.S. Cl. ................................. 219/137 R; 219/136
[58] Field of Search ............. 219/137 R, 136, 137.41; 55/108

[56] References Cited

U.S. PATENT DOCUMENTS

| 342,548 | 5/1886 | Walker .............................. 55/108 X |
| 3,747,301 | 7/1973 | Glover et al. .................... 55/108 X |
| 3,945,813 | 3/1976 | Ilinoya et al. ......................... 55/108 |
| 4,202,674 | 5/1980 | Rodenberger et al. ............... 55/108 |

FOREIGN PATENT DOCUMENTS 431381 1/1943 Japan ............................. 219/137.41

OTHER PUBLICATIONS

Cary, Howard B. *Modern Welding Technology* 1970, pp. 57, 81.

Primary Examiner—Roy N. Envall, Jr.
Assistant Examiner—Catherine M. Sigda

[57] ABSTRACT

A method and system of eliminating welding fumes by subjecting the air close to the welding point to a quiet electric discharge between an electrode supplied with a high voltage of direct current, and the work piece or another grounded object.

20 Claims, 7 Drawing Figures

WELDING METHOD AND EQUIPMENT THEREFOR

In welding work and in particular when welding metals but also other materials, a source of high temperature such as an electric arc or a gas flame is often used. The intense heat causes the material of a work piece and of additive material to be evaporated in order during a subsequent condensation to form smoke particles outside of the hottest zone.

The smoke consists of small particles, mostly of metallic oxides, but also of silicon dioxide. The particles are so small that they are suspended in the air with such a small velocity of fall that they follow in the movement of the rising hot current of air formed above the welding point and are spread in the air in the form of smoke.

It is therefore a principal object of the present invention to provide a method that solves said problem consisting in the noxious and bothersome smoke and to provide an equipment, which is well suited for use, when carrying out the method in practice.

The invention is described in the following specification, and also how it can impede the spreading of smoke particulars produced in the welding work, and more particularly in connection with electric arc welding, by electrically charging the particles and causing them to be deposited on and adhere to grounded objects, such as for example the work piece and by this arrangement to impede the appearance of smoke. Reference is made to the accompanying drawings, in which FIG. 1 shows the invention applied to a conventional manually operated welding handle, FIG. 2 shows an electric circuit diagram suitable for use in connection with the invention, and FIGS. 3–7 show alternative embodiments of a high voltage electrode for the suppression of fumes.

The charge of the smoke particles takes place by the smoke being bombarded with the charges from a high voltage electrode, which is placed close to the welding point. The high voltage electrode can either be positive or negative relative to the earth and shall preferably have a voltage between 1000 volts and 100,000 volts. In order to facilitate the flow of the electric charge from the high voltage electrode by means of the employment of a pointed conductor said electrode can preferably be equipped with one or more of such pointed conductors or edges. An electric field and a current of electric charges are produced between the high voltage electrode and a grounded object, for example the work piece. Part of these charges are taken up by the smoke particles, so that they will be charged and as a result thereof attracted by the grounded object in downwards direction.

Figure 2:
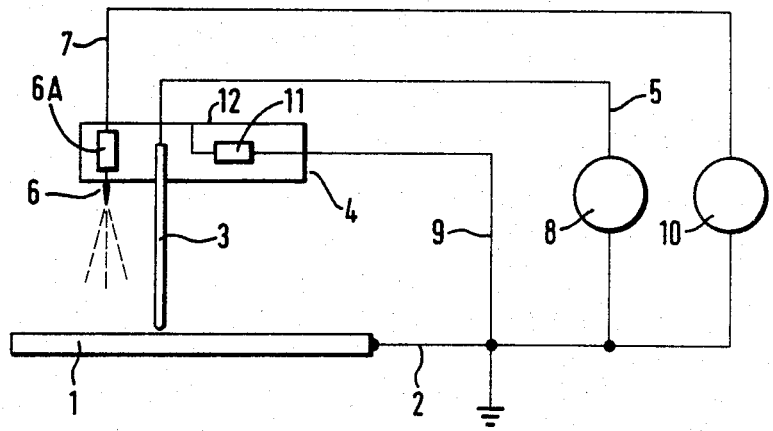

The invention is shown in FIG. 1 in the form of an example, in which it is applied together with a coated electrode in a conventional commercial welding operation. The work piece 1 is by means of a grounded cable 2 connected to ground clamps 2A of a conventional welding set. A conventional welding electrode 3 is via a handle 4 and a conductor 5 connected with the tension clamp of the welding set, and the welding operation takes place in a normal way with normal voltage and current. So far everything is conventional technique. However, the handle 4 is also provided with a high voltage electrode 6, which via a high voltage conductor 7 is connected with a high voltage source, the ground clamp of which preferably via a branch of the grounded cable 2 is connected with the work piece 1. A charging current flows in downwards direction towards the work piece 1 and the welding point, charging the smoke particles and causing them to find their way to the work piece 1 and adhere to the same and to a certain extent to the welding electrode. The separation of the smoke particles is facilitated by the air current (electric wind), that arises from the high voltage electrode 6 in direction to the work piece 1. This air current counteracts the rise of hot air from the welding point. Very few particles are therefore spread in the air, and the smoke formation from the welding operation is almost entirely eliminated. By using several high voltage electrodes in an arrangement round the welding point it is possible to eliminate also the remaining smoke.

The necessary current intensity at the high voltage electrode 6 is preferably less than 1 mA in connection with a normal welding operation carried out by hand. Thus, the necessary power output of the high voltage generator is low, less than 100 W, which means that the high voltage source can be manufactured at a low cost. The current intensity of 1 mA is also not dangerous for human beings. The high voltage source is designed in such a way that it can yield a constant current. This impedes the formation of violent sparks and sparkovers, if the high voltage electrode will arrive in proximity of grounded objects. A series rheostat 6A at the connection of the high voltage electrode to the high voltage conductor 7 can also contribute to a smooth output current and suppress the formation of sparks. If the high voltage source and the series rheostat 6A are suitably designed, the suppression can even be so efficient that one can touch the high voltage electrode 6 without any feeling of discomfort.

Part of the charges from the high voltage electrode 6 hits the welder. This does not involve any feeling of discomfort as long as the welder is in conductive connection with the earth and continuously discharged. However, should he be insulated from the earth, he will be gradually charged, and then he may experience unpleasant sparks of discharge, if he should touch grounded objects. In order to secure that the welder is grounded, it is suitable to provide the welding handle 4 with a grounded cable 9, which via a resistance limiting the current is connected with a conductive surface portion of the welding handle. Common protective gloves of leather do not constitute any impediment, as such gloves have sufficient conductivity.

The electric diagram in manual welding work is shown in FIG. 2, the figures therein having the following significations:

| | |
|---|---|
| 1 | work piece |
| 2 | ground connection for the work piece |
| 2A | ground clamp |
| 3 | welding electrode |
| 4 | welding handle with |
| 9 | grounded connection for the welder |
| 5 | welding cable |
| 6 | high voltage electrode |
| 6A | series rheostat at the high voltage electrode |
| 7 | high voltage conductor |
| 8 | source of welding current |
| 10 | high voltage generator |
| 11 | resistance for current limitation |
| 12 | conductive surface portion. |

When welding work pieces of small size, it is suitable to increase the grounded surface and consequently the smoke absorption by placing the work piece 1 on a bigger grounded plate or fixture of conductive material. In some cases it can also be of advantage to place a screen of conductive material between the welding point and such objects, that need to be protected against deposits of smoke particles.

The high voltage generator 10 and the current source 8 can of course suitably be assembled in order to form a unit. The high voltage generator 10 can in such a case preferably be controlled by the welding current, so that it generates the high voltage only, when the welding operation is going on.

The smoke elimination by charging the smoke has been described above in an application to a manually carried out welding operation. However, a similar procedure can be used in order to reduce the fumes in connection with other welding methods such as in welding by machine, gas welding, argon welding, laser welding etc. irrespective of additive substances being used or not.

It is of course not necessary that the high voltage electrode 6 is carried by the welding handle 4, as said electrode also can be fitted in other places. It can by way of example be fitted to a connecting part, which is suited to be fastened to the work piece or to any other suitable point close to the welding point.

The current of the charges from a point electrode (FIGS. 1 and 3) substantially departs from the very point and is directed in the direction of the same. The charges drag along molecules of the air and an air current arises in the direction of the point. However, this electric wind can sometimes be so strong that it blows away part of the smoke particles of the welding fumes in a pure mechanical manner before said particles have had time to deposit themselves on the nearest grounded object.

According to the present invention the electric wind can in such cases be moderated, and a still more improved result of suppression of the fumes can be obtained by means of a high voltage electrode, which is adapted to provide a simultaneous discharge in different directions in order to reduce the electric wind. This electrode can suitably be provided with several points directed in at least opposite directions, so that the electric winds from the different points at least to some extent neutralize each other. This reduction of the electric wind can preferably also be obtained by means of an electrode comprising a transversally arranged disc exhibiting a sharp periphery, where the discharges in different directions take place simultaneously.

Figure 3:
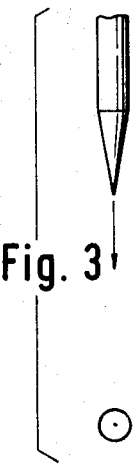
Figure 4:
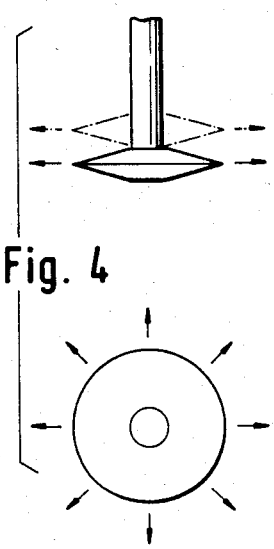
Figure 5:
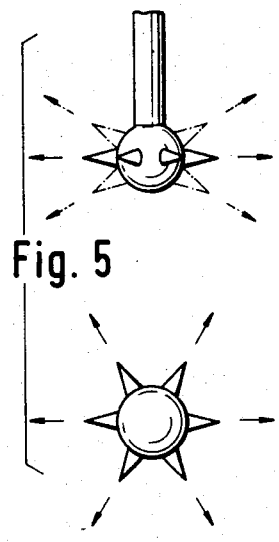
Figure 6:
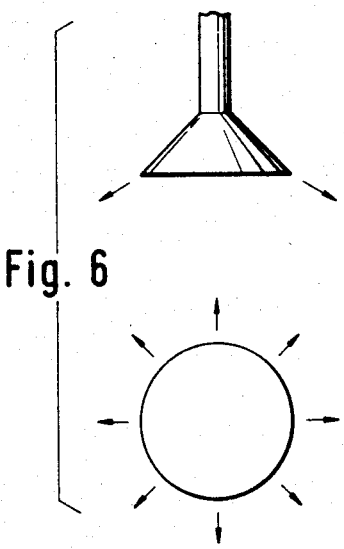
Figure 7:
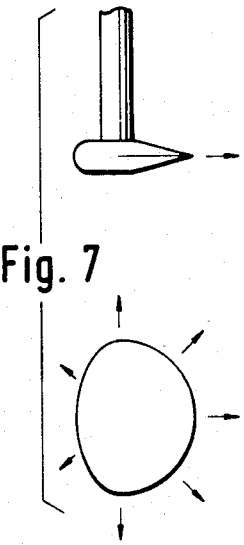

FIG. 3 shows the point electrode appearing in FIG. 1, and FIGS. 4 and 5 show different alternative embodiments of the same according to the present invention, in which the strength of the electric wind has been reduced by the electric discharge taking place in opposite directions. FIG. 6 shows an alternative embodiment relative to the one according to FIG. 4, the angles between the sides of the electrode located nearest to the discharge edge being different. If one desires to avoid the electric wind to the greatest possible extent and moderate the electric wind and the vortex formation, which takes place in connection with a discharge in one plane, the points and/or edges are preferably in other planes (many angles in space) marked with broken lines in FIGS. 4 and 5. A type with a conical discharge is shown in FIG. 7, where the electric wind will not be so strong as when a simple point electrode is used, but it will anyhow get a certain direction.

When the high voltage electrode is used in the immediate vicinity of a grounded object, which occupies an assymetric location, by way of example a welding electrode, and one does not desire that too great a portion of the discharge current takes the shorter path direct to the grounded object, one preferably uses a disc with a less sharp edge directed towards the grounded object. The less sharp edge results in a decrease of the strength of the field and consequently of the intensity of the discharge in that direction.

The invention is not limited to the embodiments described above and illustrated in the drawings as examples only, but can be varied as to its details within the scope of the following claims without departing from the fundamental idea of the invention.

I claim:

1. Welding means, comprising: a grounded electrode for connection to a workpiece to be welded, a source of electrical energy, a welding electrode connected to said source of electrical energy for welding said workpiece at a point, at least one further electrode, means for supporting said further electrode adjacent said point of welding at said workpiece, and a current source for generating high voltage direct current, said current source having a first terminal connected to said further electrode, and a second terminal for connection to said workpiece, whereby upon a high-voltage discharge from said further electrode smoke particles formed at the point of welding will be electrically charged and deposited at least on one of said grounded electrode and workpiece.

2. Welding means according to claim 1, wherein said further electrode is a pointed electrode.

3. Welding means according to claim 1, comprising a holder for said welding electrode of said welding means, said further electrode being mounted on said holder.

4. Welding means according to claim 3, wherein said further electrode extends substantially parallel to the welding electrode placed in said holder.

5. Welding means according to claim 3, wherein said holder has a conductive surface, and means for grounding said conductive surface.

6. A welding means according to claim 5, comprising a resistance between said grounding means and said conductive surface.

7. Welding means according to claim 1, comprising means for limiting the current generated by said high voltage source to a maximum of approximately 1 mA.

8. Welding means according to claim 7, wherein said high voltage source is a constant current generator.

9. Welding means according to claim 1, comprising a current limiting series resistance between said current source and said further electrode.

10. Welding means according to claim 9, wherein said resistance is a series rheostat.

11. Welding means according to claim 1, comprising means for controlling the current of said high voltage source such that it is operational only during welding.

12. Welding means according to claim 1, wherein said further electrode is shaped to effect a high-voltage discharge in a plurality of directions to thereby reduce electric wind.

13. Welding means according to claim 12, wherein said further electrode comprises several points pointing in different directions.

14. Welding means according to claim 12, wherein said further electrode is disc-shaped and having at least one sharp edge where discharge occurs.

15. Welding means according to claim 12, wherein said further electrode has a mantle surface with an edge forming a high voltage discharge point.

16. Welding means according to claim 12, wherein said further electrode is asymetric whereby high voltage discharge is suppressed in certain directions.

17. Welding means according to claim 16, wherein said further electrode is provided with at least one edge for creating a discharge in different directions.

18. Welding means according to claim 16, wherein said further electrode is provided with several points of different sharpness.

19. Welding means according to claim 16, wherein said further electrode is provided with a plurality of points distributed unevenly over said electrode.

20. A method of electrical welding a workpiece comprising the steps of:
grounding an electrode to a workpiece to be welded;
connecting a welding electrode to a source of electrical energy;
welding said workpiece at a point with an arc formed by said welding electrode;
the improvement comprising the steps of providing a high voltage electrode in the welding area;
and establishing a high voltage electrical discharge from said high voltage electrode to the workpiece in the welding area during welding for minimizing particle emission.

* * * * *